(12) United States Patent
Bishwas

(10) Patent No.: US 11,939,689 B2
(45) Date of Patent: Mar. 26, 2024

(54) ELECTRODE SYSTEM

(71) Applicant: Hymeth ApS, Soborg (DK)

(72) Inventor: Sumon Bishwas, Copenhagen (DK)

(73) Assignee: HYMETH APS (DK)

( * ) Notice: Subject to any disclaimer, the term of this patent is extended or adjusted under 35 U.S.C. 154(b) by 181 days.

(21) Appl. No.: 17/427,706

(22) PCT Filed: Feb. 20, 2020

(86) PCT No.: PCT/EP2020/054514
§ 371 (c)(1),
(2) Date: Aug. 2, 2021

(87) PCT Pub. No.: WO2020/169750
PCT Pub. Date: Aug. 27, 2020

(65) Prior Publication Data
US 2022/0127732 A1  Apr. 28, 2022

(30) Foreign Application Priority Data
Feb. 20, 2019  (EP) .................................... 19158309

(51) Int. Cl.
C25B 9/77   (2021.01)
C25B 1/04   (2021.01)
C25B 9/65   (2021.01)

(52) U.S. Cl.
CPC ............. *C25B 9/77* (2021.01); *C25B 1/04* (2013.01); *C25B 9/65* (2021.01)

(58) Field of Classification Search
CPC .......... C25B 9/77; C25B 9/65; H01M 8/0202; H01M 8/0247
(Continued)

(56) References Cited

U.S. PATENT DOCUMENTS 4,217,199 A * 8/1980 Cunningham ............. C25B 9/73
204/255
4,402,810 A * 9/1983 Boulton .................... C25B 9/73
204/263
(Continued)

FOREIGN PATENT DOCUMENTS

| GB | 1341027 | 12/1973 |
|---|---|---|
| WO | 9507373 | 3/1995 |
| WO | 2015085369 | 6/2015 |

OTHER PUBLICATIONS

Examination Report for Indian Patent Application No. 202147041826 dated Mar. 16, 2023, 5 pages.
(Continued)

*Primary Examiner* — Harry D Wilkins, III
(74) *Attorney, Agent, or Firm* — McAndrews, Held & Malloy, Ltd.

(57) ABSTRACT

An electrode system comprising: a plurality of first electrode plates (3) and a plurality of second electrode plates (5') arranged alternatingly to form an electrode stack, each first electrode plate having a first electrode plate first busbar opening and a first electrode plate second busbar opening extending through the first electrode plate, the first electrode plate second busbar opening being larger than the first electrode plate first busbar opening, each second electrode plate (5') having a second electrode plate first busbar opening (27a') extending through the second electrode plate (5'), the second electrode plate first busbar opening (27a') being dimensioned larger than each of the first electrode plate first busbar openings and aligned with the first electrode plate first busbar openings, and a second electrode plate second busbar opening (27b') extending through the second electrode plate (5'), the second electrode plate second busbar opening (27b') being dimensioned smaller than each of the first electrode plate second busbar openings and aligned with (Continued)

the first electrode plate second busbar openings, a first busbar extending through the first electrode plate first busbar openings and the second electrode plate first busbar openings (27b'), the first busbar being configured to be in mechanical contact with an inner first busbar surface of the first electrode plate first busbar openings only, and a second busbar extending through the first electrode plate second busbar openings and the second electrode plate second busbar openings (27b'), the second busbar being configured to be in mechanical contact with an inner second busbar surface of the second electrode plate second busbar openings (27b') only.

13 Claims, 5 Drawing Sheets

(58) Field of Classification Search
USPC .................................... 204/253–258, 290.05
See application file for complete search history.

(56) References Cited

U.S. PATENT DOCUMENTS

| | | | | |
|---|---|---|---|---|
| 4,432,858 A | * | 2/1984 | Schmitt | C25B 9/73 |
| | | | | 204/279 |
| 4,484,998 A | * | 11/1984 | Nevin | C25B 15/08 |
| | | | | 204/263 |
| 4,648,953 A | * | 3/1987 | Wardle | C25B 9/73 |
| | | | | 204/255 |
| 5,843,292 A | * | 12/1998 | Spiros | F23D 14/38 |
| | | | | 204/267 |
| 8,852,410 B1 | | 10/2014 | Turgeon et al. | |
| 9,212,745 B2 | | 12/2015 | Kritzer | |
| 2003/0134175 A1 | * | 7/2003 | Karichev | H01M 8/2459 |
| | | | | 429/456 |
| 2010/0275859 A1 | * | 11/2010 | Klotz | C25B 11/00 |
| | | | | 123/3 |
| 2012/0234265 A1 | * | 9/2012 | Ball | F02B 43/10 |
| | | | | 204/266 |
| 2014/0251794 A1 | | 9/2014 | Kirkpatrick | |
| 2015/0034479 A1 | * | 2/2015 | Pan | C25B 11/00 |
| | | | | 204/278 |
| 2017/0029966 A1 | * | 2/2017 | Turgeon | C25B 9/05 |

OTHER PUBLICATIONS

Extended European Search Report for Application No. 19158309.5 dated Aug. 1, 2019, 7 pages.
International Search Report and Written Opinion corresponding to International Patent Application No. PCT/EP2020/054514, dated May 14, 2020.

* cited by examiner

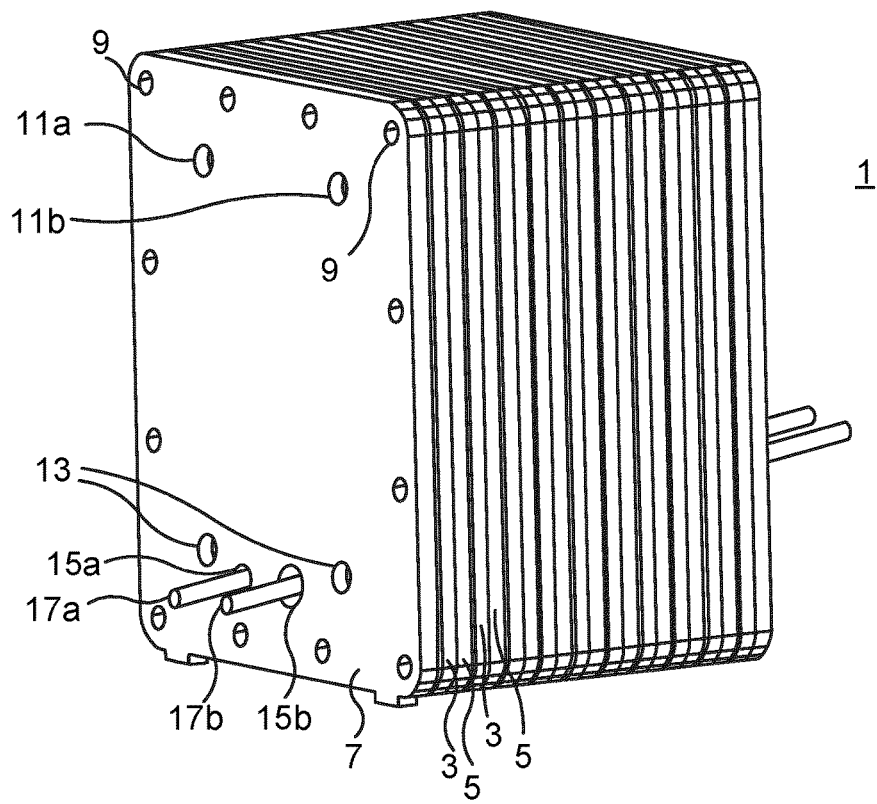
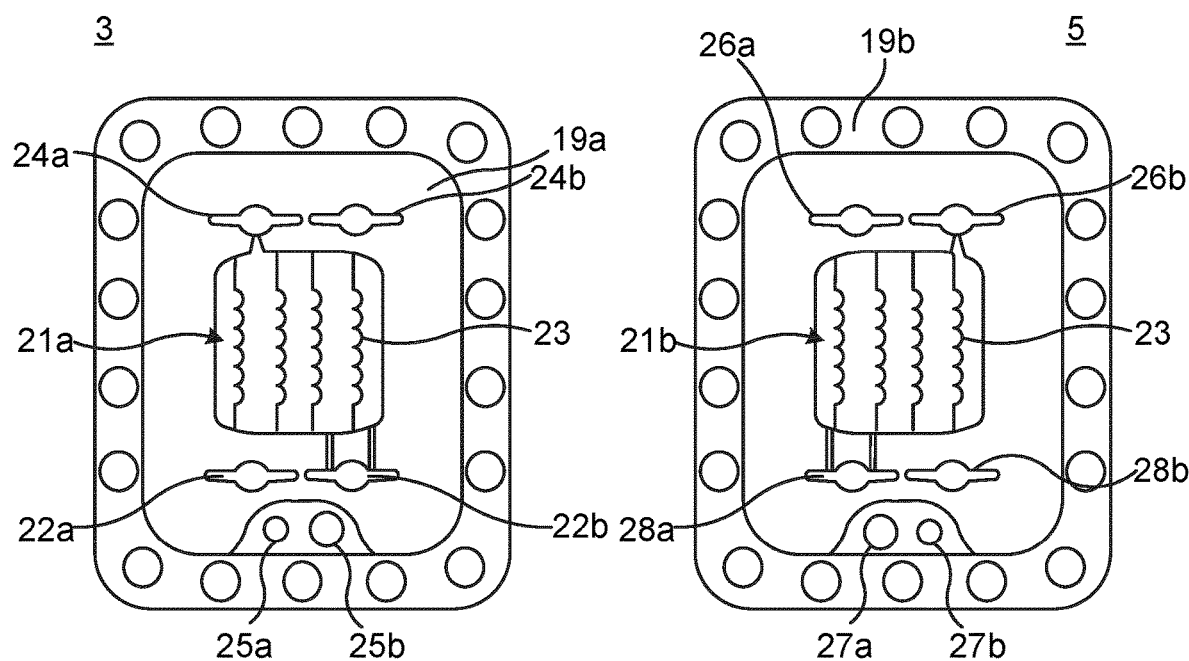
Fig. 1
Fig. 2a  Fig. 2b

ELECTRODE SYSTEM

CROSS-REFERENCE TO RELATED APPLICATIONS/INCORPORATION BY REFERENCE

The present application is the U.S. national phase under § 371 of International Application No. PCT/EP2020/054514, having an international filing date of Feb. 20, 2020, which claims priority to EP Patent Application No. 19158309.5, filed Feb. 20, 2019. Each of the above-mentioned prior-filed applications is hereby expressly incorporated herein by reference in its entirety.

TECHNICAL FIELD

The present disclosure relates to the powering of electrodes of an electrode stack, for example of an electrolyser.

BACKGROUND

A stack of electrodes may be used in a great plurality of applications. One application which may utilise a stack of electrodes is that of electrolysis.

Electrolysis of water is a process in which water molecules are decomposed, forming hydrogen gas and oxygen gas. This process occurs as a result of an electric current flowing between two electrodes submerged in water.

In existing solutions, the mechanical connection between the power source and the electrodes may be relatively bulky. Furthermore, it may be relatively laborious to make the necessary connections to the power source during installation.

SUMMARY

In view of the above, a general object of the present disclosure is to provide an electrode system which solves or at least mitigates the problems of the prior art.

There is hence provided an electrode system comprising: a plurality of first electrode plates and a plurality of second electrode plates arranged alternatingly to form an electrode stack, each first electrode plate having a first electrode plate first busbar opening and a first electrode plate second busbar opening extending through the first electrode plate, the first electrode plate second busbar opening being larger than the first electrode plate first busbar opening, each second electrode plate having a second electrode plate first busbar opening extending through the second electrode plate, the second electrode plate first busbar opening being dimensioned larger than each of the first electrode plate first busbar openings and aligned with the first electrode plate first busbar openings, and a second electrode plate second busbar opening extending through the second electrode plate, the second electrode plate second busbar opening being dimensioned smaller than each of the first electrode plate second busbar openings and aligned with the first electrode plate second busbar openings, a first busbar extending through the first electrode plate first busbar openings and the second electrode plate first busbar openings, the first busbar being configured to be in mechanical contact with an inner first busbar surface of the first electrode plate first busbar openings only, and a second busbar extending through the first electrode plate second busbar openings and the second electrode plate second busbar openings, the second busbar being configured to be in mechanical contact with an inner second busbar surface of the second electrode plate second busbar openings only.

The busbar connections with the electrode stack are hence internal, extending through the interior of the electrode stack, which thus reduces the external footprint of the busbars and their connections to the first and second electrode plates. Additionally, the external surfaces of the electrode stack may thereby be directly accessible, for example for external cooling purposes of the first electrode plates and the second electrode plates.

The first busbar is hence dimensioned to be in mechanical contact with the inner first busbar surfaces of the first electrode plate first busbar openings only of the first electrode plate first busbar openings and the second electrode plate first busbar openings.

The second busbar is hence dimensioned to be in mechanical contact with the inner second busbar surfaces of the second electrode plate second busbar openings only of the first electrode plate second busbar openings and the second electrode plate second busbar openings.

The first busbar may for example be made of copper or aluminium. The second busbar may for example be made of copper or aluminium.

The first busbar and the second busbar may have the same external diameter. The first busbar and the second busbar may for example be identical or essentially identical.

One example may comprise a plurality of first busbars, and each first electrode plate may comprise a plurality of first electrode plate first busbar openings, wherein each first busbar extends through and is in mechanical contact with the inner first busbar surface of a respective first electrode plate first busbar opening.

One example may comprise a plurality of second busbars, and each second electrode plate may comprise a plurality of second electrode plate second busbar openings, wherein each second busbar extends through and is in mechanical contact with the inner second busbar surface of a respective second electrode plate second busbar opening.

According to one example each first electrode plate second busbar opening is configured to receive a plurality of second busbars. The first electrode plate second busbar opening of each first electrode plate may be dimensioned such that none of the second busbars extending through it is in electrical contact with the first electrode plate. According to one example the second electrode plate first busbar openings are configured to receive a plurality of the first busbars. The second electrode plate first busbar opening of each second electrode plate may be dimensioned such that none of the first busbars extending through it is in electrical contact with the second electrode plate.

Preferably, the number of first busbars and the second busbars is the same.

According to one embodiment the first busbar is an anode busbar and the second busbar is a cathode busbar.

According to one embodiment every first electrode plate is an anode and every second electrode plate is a cathode.

According to one embodiment each first electrode plate has a first frame which delimits a first inner volume, the first frame having a first oxygen gas channel, a first hydrogen gas channel, wherein of the first oxygen gas channel and the first hydrogen gas channel only the first oxygen gas channel is connected to the first inner volume, and a water channel connected to the first inner volume.

According to one embodiment each second electrode plate has a second frame which delimits a second inner volume, the second frame having a second oxygen gas channel aligned with the first oxygen gas channels, a second hydrogen gas channel aligned with the first hydrogen gas channels, wherein of the second oxygen gas channel and the second hydrogen gas channel only the second hydrogen gas channel is connected to the second inner volume, and a second water channel aligned with the water channel.

According to one embodiment the first busbar is configured to engage with the inner first busbar surfaces and the second busbar is configured to engage with the inner second busbar surfaces.

According to one embodiment the inner first busbar surfaces are threaded and the first busbar is provided with external threads configured to form a threaded connection with the threads of the inner first busbar surfaces, and the inner second busbar surfaces are threaded and the second busbar is provided with external threads configured to form a threaded connection with the threads of the inner second busbar surfaces.

According to one embodiment the first busbar and the second busbar have a circular cross section. The first busbar may thereby for example be screwed into the first electrode plate first busbar openings and the second busbar may for example be screwed into the second electrode plate second busbar openings.

According to one embodiment the first busbar is provided with a plurality of radially outwards extending first fins, the first fins being provided with a respective first fin locking structure, and the inner first busbar surface is provided with a plurality of radially inwards extending first protrusions each provided with an inner first locking structure, each inner first locking structure being configured to mate with a respective first fin locking structure.

The second electrode plate first busbar openings may have a smallest dimension which is greater than the largest cross-sectional dimension of the first busbar along the length of the first busbar extending through the electrode stack. The first busbar will hence not be in mechanical contact with the inner surfaces of the second electrode plate first busbar openings.

The surface contact volume between the first busbar and the first electrode plates may be increased and therefore more current can be passed to the first electrode plates from the first busbar.

According to one embodiment the first fin locking structures are tangential protrusions configured to snap-fit with a respective inner first locking structure.

The first busbar may thereby be mechanically locked with the first electrode plates by twisting the first busbar during installation.

The first fin locking structures may extend tangentially from their respective first fin towards the next first fin, one after the other in a first circumferential direction of the first busbar.

According to one embodiment the second busbar is provided with a plurality of radially outwards extending second fins, the second fins being provided with a respective second fin locking structure, and the inner second busbar surface is provided with a plurality of radially inwards extending second protrusions each provided with an inner second locking structure, each inner second locking structure being configured to mate with a respective second fin locking structure.

The first electrode plate second busbar openings may have a smallest dimension which is greater than the largest cross-sectional dimension of the second busbar along the length of the second busbar extending through the electrode stack. The second busbar will hence not be in mechanical contact with the inner surfaces of the first electrode plate second busbar openings.

The surface contact volume between the second busbar and the second electrode plates may be increased and therefore more current can be passed to the second electrode plates from the second busbar.

According to one embodiment the second fin locking structures are tangential protrusions configured to snap-fit with a respective inner second locking structure.

The second busbar may thereby be mechanically locked with the second electrode plates by twisting or rotating the second busbar during installation.

The second fin locking structures may extend tangentially from their respective second fin towards the next second fin, one after the other in a first circumferential direction of the second busbar.

According to one embodiment the first busbar comprises two separated first halves extending parallel with each other in the axial direction of the first busbar, and a first distance setting assembly configured to enable adjustment of a distance between the two first halves to thereby enable a tight fit with the first electrode plate first busbar openings, and wherein the second busbar comprises two separated second halves extending parallel with each other in the axial direction of the second busbar, and a second distance setting assembly configured to enable adjustment of the distance between the two second halves to thereby enable a tight fit with the second electrode plate second busbar openings.

The two first halves of the first busbar may thereby be pressed towards the inner first busbar surface to obtain better mechanical contact between the first busbar and the first electrode plates. The two first halves may be moved away from each other by rotating the According to one embodiment the first distance setting assembly includes a first screw in each end region of the first busbar, extending radially through the two first halves and each first screw is provided with two first nuts enabling the adjustment of the distance between the two first halves, and the second distance setting assembly includes a second screw in each end region of the second busbar, extending radially through the two second halves and each second screw is provided with two second nuts enabling the adjustment of the distance between the two second halves.

The two second halves of the second busbar may thereby be pressed towards the inner second busbar surface to obtain better mechanical contact between the second busbar and the second electrode plates.

According to one embodiment the electrode system is an electrolyser system. The electrolyser system may be a high-pressure electrolyser system.

One embodiment comprises a plurality of electrically conducting planar spacers, each spacer having a through-opening configured to receive a first busbar or a second busbar, wherein the first electrode plates and the second electrode plates are coated with a heat conductive polymer, wherein the first electrode plates and second electrode plates have an exposed region where the underlying metal core has been exposed, the exposed region of the first electrode plates being provided with a respective one of the first electrode plate first busbar opening and the exposed region of the second electrode plates being provided with a respective one of the second electrode plate second busbar opening, wherein for each first electrode plate one spacer is arranged on one side of the first electrode plate first busbar opening and another spacer is arranged on an opposite side of the first electrode plate first busbar opening, and for each second electrode plate one spacer is arranged on one side of the second electrode plate second busbar opening and another spacer is arranged on an opposite side of the second electrode plate second busbar opening, the spacers thereby being arranged in mechanical and electrical contact with both the front and rear surfaces of the exposed regions.

The thickness of the conducting material with which the busbars are in contact is thereby increased. The spacers and hence act as an additional contact surfaces for the busbars. This increases the length with which the busbars are in electrical contact with the electrode plates, which is advantageous in case the electrode plates are very thin and large currents are to be passed to the electrode plates. The current passed from the busbars to the electrode plates may thereby be increased.

The spacers may alternatively be referred to as contact elements.

According to one example the electrode system may comprise: a cabinet and a plurality of first busbars, each first electrode plate comprising a plurality of first electrode plate first busbar openings, and a plurality of second busbars, each second electrode plate comprising a plurality of second electrode plate second busbar openings, the electrode system comprising first pantographs connected between pairs of first busbars, the first pantographs being configured to press the first busbars towards the first electrode plates, and second pantographs connected between pairs of second busbars, the second pantographs being configured to press the second busbars towards the second electrode plates.

The plurality of first electrode plates may for example be two first electrode plates. The plurality of second electrode plates may for example be two second electrode plates.

According to one example, the electrode system may comprise a cabinet provided with electrical connectors configured to be connected to the first busbar and the second busbar, and an electromagnet, wherein the electrode stack forms part of an electrolyser, the electrolyser comprising ferromagnetic material configured to magnetically interact with the electromagnet when the electrolyser is arranged inside the cabinet.

The electromagnet may be energised when the electrolyser is placed inside the cabinet to properly align the electrolyser inside cabinet and to secure an electrical connection between the electrical connectors and the first busbar and second busbar. When the electrolyser is to be removed, the electromagnet may be deenergised.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Examples of the inventive concept will now be described, by way of example, with reference to the accompanying drawings, in which:

FIG. 1 schematically shows a perspective view of an example of an electrode system;

FIG. 2a schematically shows a front view of a first electrode plate;

FIG. 2b schematically shows a front view of a second electrode plate;

FIG. 4b schematically depicts a side view of the busbar in FIG. 4a;

FIG. 6b schematically shows an electrode plate for use with the busbar depicted in FIG. 6a.

DETAILED DESCRIPTION

Figure 3A:
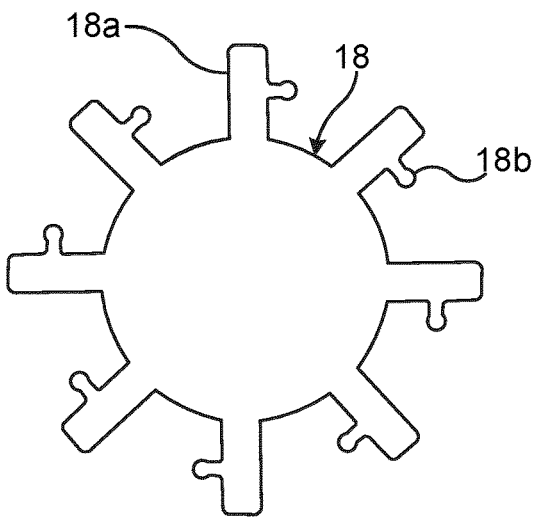
FIG. 3a schematically shows a cross section of one example of a busbar.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 depicts an example of an electrode system comprising a plurality of electrode plates forming an electrode stack. In the following, the electrode system will be exemplified by an electrolyser system for electrolysis. It should however be understood that an electrode stack for any application may benefit from the busbar structure as will be described herein in the context of electrolysis.

The exemplified electrode system 1 comprises a plurality of first electrode plates 3 and a plurality of second electrode plates 5. The first electrode plates 3 and the second electrode plates 5 are arranged alternatingly and form an electrode stack. Each pair of first electrode plate 3 and adjacent second electrode plate 5 forms an electrolytic cell.

The electrode system 1 may comprise membranes such as separator membranes. A respective membrane may be arranged between a pair of a first electrode plate 3 and a second electrode plate 5. Thus, a respective membrane may be sandwiched between a first electrode plate 3 and a second electrode plate 5.

The first electrode plates 3 are electrically insulated from the second electrode plates 5.

The exemplified electrode system 1 has two end plates, one at each end of the electrode stack. In FIG. 1 only one end plate 7 is visible. The end plates 7 may comprise a plurality of openings 9 distributed along the perimeter of the end plates 7. The openings 9 may be configured to receive fasteners to hold the electrode stack together. The fasteners may for example comprise compression rods extending through the electrode stack and nuts and/or bolts for attaching the compression rods to the electrode stack.

The exemplified end plate 7 furthermore comprises two gas channels. In this example a first gas channel is an oxygen gas channel 11a and a second gas channel is a hydrogen gas channel 11b. The exemplified end plate 7 furthermore comprises water channels 13. The end plate 7 has first and second busbar openings 15a and 15b.

The electrode system 1 furthermore comprises a first busbar 17a and a second busbar 17b. The first busbar 17a extends through the first busbar opening 15a and through the entire electrode stack, and the second busbar 17b extends through the second busbar opening 15b of the first end plate 7 and through the entire electrode stack. The exemplified first busbar 17a and the second busbar 17b hence extend through the entire electrode stack, including all first electrode plates 3, all second electrode plates 5 and both end plates.

The first busbar 17a and the second busbar 17b are according to the example shown in FIG. 1 in no mechanical or electrical contact with the end plate 7. Hereto, for example, the first busbar opening 15a and the second busbar opening 15b may have at least somewhat larger dimensions than the cross-sectional dimensions of the first busbar 17a and the second busbar 17b. According to one variation the end plate 7 may be provided with solid electrical insulation between the first busbar 17a and the first busbar opening 15a and between the second busbar 17b and the second busbar opening 15b.

FIG. 2a shows a front view of one example of a first electrode plate 3. The first electrode plate 3 has an electrically conductive first frame 19a which delimits a first inner volume 21a. The first frame 19a may for example comprise a metal core such as copper or aluminium. The first frame 19a, in particular the metal core, may be coated with a heat conductive polymer. The coating of the heat conductive polymer may for example be obtained by means of injection moulding.

The first electrode plate 3 is provided with a plurality of coils 23 extending inside the first inner volume 21a between opposite sides delimiting the first inner volume 21a. The coils 23 are electrically connected to the first frame 19a. The coils 23 may be arranged in parallel with each other.

The first electrode plate 3 furthermore comprises a first and a second water channel 22a and 22b of which only the second water channel 22b is connected to the first inner volume 21a. Hence, only the second water channel 22b of the first water channel 22a and the second water channel 22b is in fluid communication with the first inner volume 21a. In the electrode stack, the first and second water channel 22a and 22b are connected to a respective one of the water channels 13 of the end plate 7.

The first electrode plate 3 furthermore comprises a first gas channel 24a, e.g. a first oxygen gas channel and a second gas channel 24b, e.g. a first hydrogen gas channel. Only one of the first gas channel 24a and the second gas channel 24b is connected to the first inner volume 21a. In the example shown in FIG. 2a the first gas channel 24a is connected to the first inner volume 21a. The first gas channel 24a is hence in fluid communication with the first inner volume 21a.

The first electrode plate 3 comprises a first electrode plate first busbar opening 25a. The first electrode plate first busbar opening 25a extends through the first electrode plate 3. The first electrode plate first busbar opening 25a is in the example arranged in a lower region of the first electrode plate 3.

The first electrode plate 3 comprises a first electrode plate second busbar opening 25b. The first electrode plate second busbar opening 25b extends through the first electrode plate 3. The first electrode plate second busbar opening 25b is in the example arranged in a lower region of the first electrode plate 3.

The first electrode plate second busbar opening 25b is larger than the first electrode plate first busbar opening 25a.

FIG. 2b shows a front view of one example of a second electrode plate 5. The second electrode plate 5 has an electrically conductive second frame 19b which delimits a second inner volume 21b. The second frame 19b may for example comprise a metal core such as copper or aluminium. The second frame 19b, in particular the metal core, may be coated with a heat conductive polymer. The coating of the heat conductive polymer may for example be obtained by means of injection moulding.

The second electrode plate 5 is provided with a plurality of coils 23 extending inside the second inner volume 21b between opposite sides delimiting the second inner volume 21. The coils 23 are electrically connected to the second frame 19b. The coils 23 may be arranged in parallel with each other.

The second electrode plate 5 furthermore comprises a first and a second water channel 28a and 228b of which only the first water channel 28a is connected to the second inner volume 21b. Hence, only the first water channel 28a of the first water channel 28a and the second water channel 28b of the second electrode plate 5 is in fluid communication with the second inner volume 21b. In the electrode stack, the first and second water channel 28a and 28b are connected to a respective one of the water channels 22a and 22b of the first electrode plates 3 and the water channels 13 of the end plate 7.

The second electrode plate 5 furthermore comprises a first gas channel 26a, e.g. a second oxygen gas channel and a second gas channel 26b, e.g. a second hydrogen gas channel, which are aligned with and connected to the corresponding gas channels of the first electrode plate 3. Only one of the first gas channel 26a and the second gas channel 26b is connected to the second inner volume 21b. In the example shown in FIG. 2b the second gas channel 26b is connected to the second inner volume 21b. The second gas channel 26b is hence in fluid communication with the second inner volume 21b.

The second electrode plate 5 comprises a second electrode plate first busbar opening 27a. The second electrode plate first busbar opening 27a extends through the second electrode plate 5. The second electrode plate first busbar opening 27a is in the example arranged in a lower region of the second electrode plate 5.

The second electrode plate 5 comprises a second electrode plate second busbar opening 27b. The second electrode plate second busbar opening 27b extends through the second electrode plate 5. The second electrode plate second busbar opening 27b is in the example arranged in a lower region of the second electrode plate 5.

The second electrode plate first busbar opening 27a is larger than the second electrode plate second busbar opening 27b.

In the electrode stack, the first electrode plate first busbar opening 25a of each first electrode plate 3 is aligned with the second electrode plate first busbar openings 27a of the second electrode plates 5 and with the first electrode plate first busbar openings 25a of the other first electrode plates 3.

In the electrode stack, the first electrode plate second busbar opening 25b of each first electrode plate 3 is aligned with the second electrode plate second busbar openings 27b of the second electrode plates 5 and with the first electrode plate second busbar openings 25b of the other first electrode plates 3.

The first busbar 17a extends through all of the first electrode plate first busbar openings 25a and second electrode plate first busbar openings 27a. The first busbar 17a is dimensioned to be in mechanical contact with an inner first busbar surface of the first electrode plate first busbar openings 25a. The second electrode plate first busbar openings 27a have a larger dimension than the first electrode plate first busbar openings 25a and the first busbar 17a is not in mechanical contact with any surface of the second electrode plate first busbar openings 27a. The first busbar 17a will thereby be able to feed current to the first electrode plates 3 only.

The second busbar 17b extends through all of the first electrode plate second busbar openings 25b and second electrode plate second busbar openings 27b. The second busbar 17b is dimensioned to be in mechanical contact with an inner second busbar surface of the second electrode plate second busbar openings 27b. The second electrode plate second busbar openings 27b have a smaller dimension than the first electrode plate second busbar openings 25b and the second busbar 17b is not in mechanical contact with any surface of the first electrode plate second busbar openings 25b. The second busbar 17b will thereby be able to feed current to the second electrode plates 5 only.

The first busbar 17a may be an anode busbar and the second busbar 17b may be a cathode busbar. The first electrode plates 3 may hence form anodes and the second electrode plates 5 may form cathodes.

According to the example depicted in FIGS. 2a-2b the first busbar 17a and the second busbar 17b have the same diameter or dimensions. The first busbar 17a and the second busbar 17b may have a circular cross-section. This may apply to any example disclosed herein.

The first busbar 17a is configured to engage with the first electrode plate first busbar openings 25a, in particular the inner first busbar surfaces. The second busbar 17b is configured to engage with the second electrode plate second busbar openings 27b, in particular the inner second busbar surfaces.

The inner first busbar surfaces may be provided with threads and the outer surface of the first busbar 17a may be provided with corresponding external threads. The first busbar 17a may thereby obtain a threaded connection with the inner first busbar surfaces and hence with the first electrode plates 3.

The inner second busbar surfaces may be provided with threads and the outer surface of the second busbar 17b may be provided with corresponding external threads. The second busbar 17b may thereby obtain a threaded connection with the inner second busbar surfaces and hence with the second electrode plates 5.

FIG. 3a shows a cross-section of another example of busbars, i.e. first busbar and second busbar. The exemplified busbar will in the following be a first busbar 18, but according to this variation, the second busbar may have the same or essentially the same configuration. The first busbar 18 comprises a plurality of radially outwards extending first fins 18a distributed along the periphery of the first busbar 18. Each first fin 18a has a first fin locking structure 18b. In the depicted example the first fin locking structures 18b extend essentially perpendicular to or perpendicular to the longitudinal axis of the corresponding first fin 18a. Each first fin locking structure 18b is hence an orthogonal protrusion with respect to the corresponding first fin 18b. Each first fin locking structure 18b may hence extend in a respective tangential direction of the first busbar 18. Each of the first fin locking structures 18b extends towards the subsequent first fin 18a when moving in a clockwise or in an alternative example, counter-clockwise direction along the periphery of the first busbar 18.

Figure 3B:
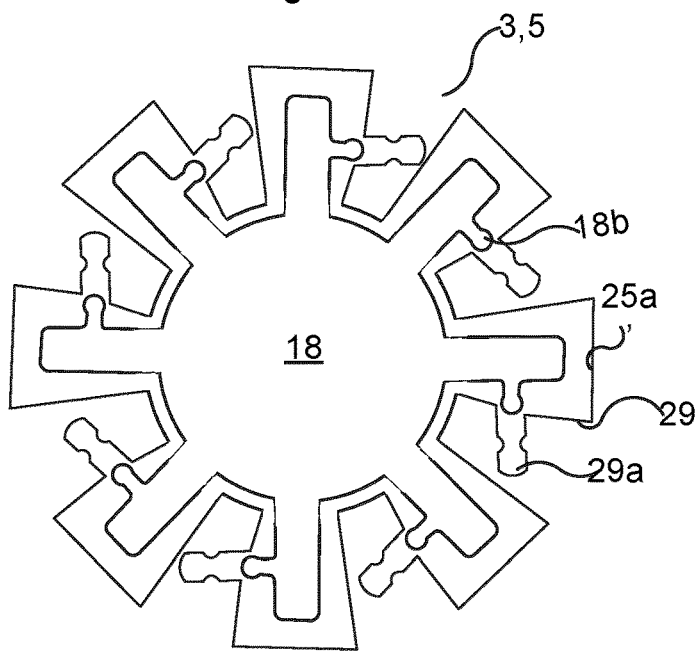
FIG. 3b schematically shows the busbar in FIG. 3a fitted in a busbar opening of an electrode plate.

FIG. 3b shows a close-up view of a busbar of the type depicted in FIG. 3a fitted in one of a first electrode plate 3' and a second electrode plate 5'. The first electrode plate 3'/second electrode plate 5' are similar to those described with reference to FIGS. 2a-b, except that at least the first electrode plate first busbar openings and second electrode plate second openings differ. The first electrode plate first busbar opening 25a' and the second electrode plate second busbar opening may in this case be provided with a plurality of radially inwards extending first protrusions or fins 29. Each first fin 18a is configured to extend between pairs of radially inwards extending first protrusions 29. Each radially inwards extending first protrusion 29 has an inner first locking structure 29a configured to mate with and engage with a respective first fin locking structure 18b. The first fin locking structures 18b and the corresponding inner first locking structure 29 may have a snap-fit engagement. The first fin locking structure 18b may for example comprise a head-structure and the inner first locking structures 29 may comprise a waist-structure, and the head-structure may be configured to be locked by the waist-structure. During assembly, a first busbar 18, for example, may first be lead through all of the first electrode plate first busbar openings in a position shown in FIG. 3b. Next, the first busbar 18 may be rotated or twisted clockwise such that the first fin locking structures 18b engage with the corresponding inner first locking structures 29.

The first electrode plate second busbar openings and the second electrode plate first busbar openings are in this case preferably made larger than the largest cross-sectional dimension of the corresponding busbar. Hence, these openings are large enough so that they do not come into mechanical contact with the first busbar and the second busbar.

Figure 4A:
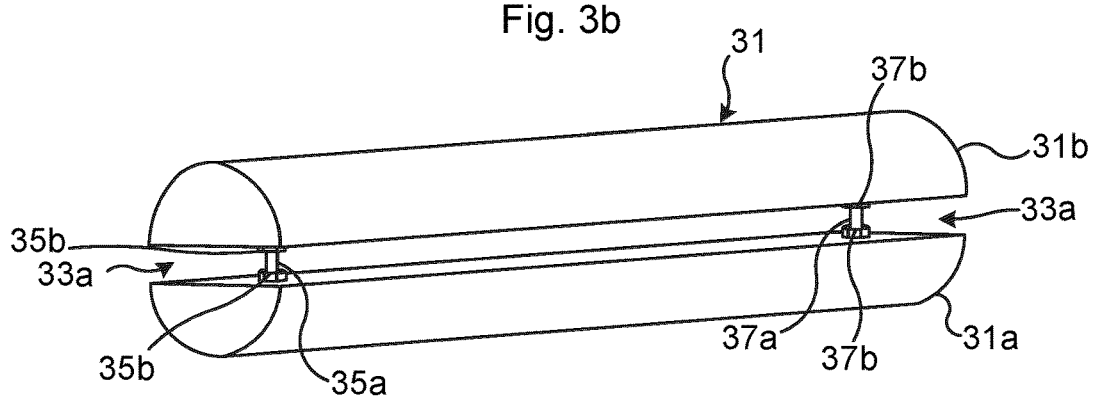
FIG. 4a schematically shows a perspective view of an example of a busbar.

FIG. 4a shows another example of a first busbar or second busbar in perspective view. Both the first busbar and the second busbar may in this example be similar or the same. The first electrode plate first busbar opening and the second electrode plate second busbar opening may have a shape adapted to the cross-sectional envelope shape of the first/second busbar, i.e. the cross-sectional contour shape.

Figure 4B:
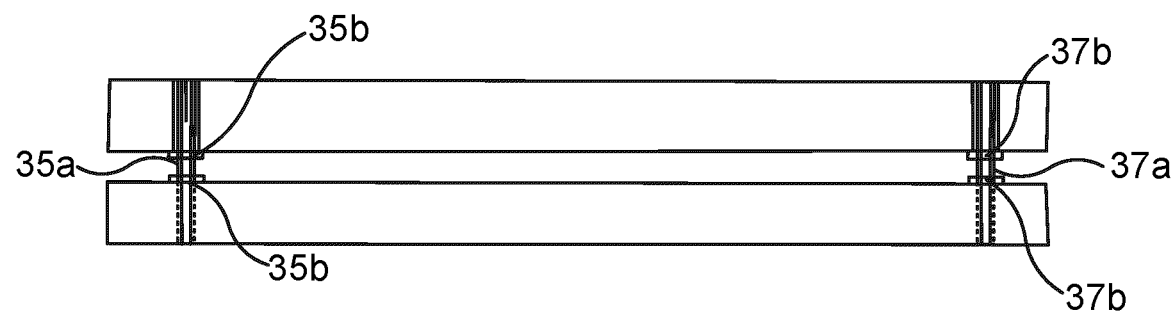

The exemplified first busbar 31 comprises two separated elongated halves 31a and 31b which are fixed to each other and arranged in parallel. The first/second busbar furthermore comprises means for adjusting the distance between the two halves 31a and 31b. The distance between the two halves 31a and 31b may beneficially be adjusted after the first/second busbar has been fitted in the corresponding first/second electrode plate first/second openings, to obtain a tight fit and good electrical contact. According to the example depicted in FIGS. 4a and 4b, the busbar comprises a first distance setting assembly 33a.

The first distance setting assembly 33a comprises two first screws 35a and 37b, each extending radially through both halves 31a-31b, and four first nuts 35b and 37b, two first nuts 35b being fitted on the first screw 35a between the two halves 31a-31b and two first nuts 37b fitted on the first screw 37b between the two halves 31a-31b. The two first screws 35a and 35b may be arranged in opposite end regions/portions of the busbar 31.

By screwing the two first nuts 35b fitted on the first screw 35a in opposite directions towards the two halves 31a and 31b, the distance between the two halves 31a-31b on that end of the busbar 31 can be adjusted. Similarly, by screwing the two first nuts 37b in opposite directions, the distance between the two halves 31a-31b on the other end of the busbar 31 can be adjusted. The busbars 31 may thereby be installed with a tight fit in the first electrode plate first busbar opening and the second electrode plate second busbar opening. The first screws 35a and 37a may beneficially be arranged outside of the electrode stack to allow adjustment after installation.

Figure 5A:
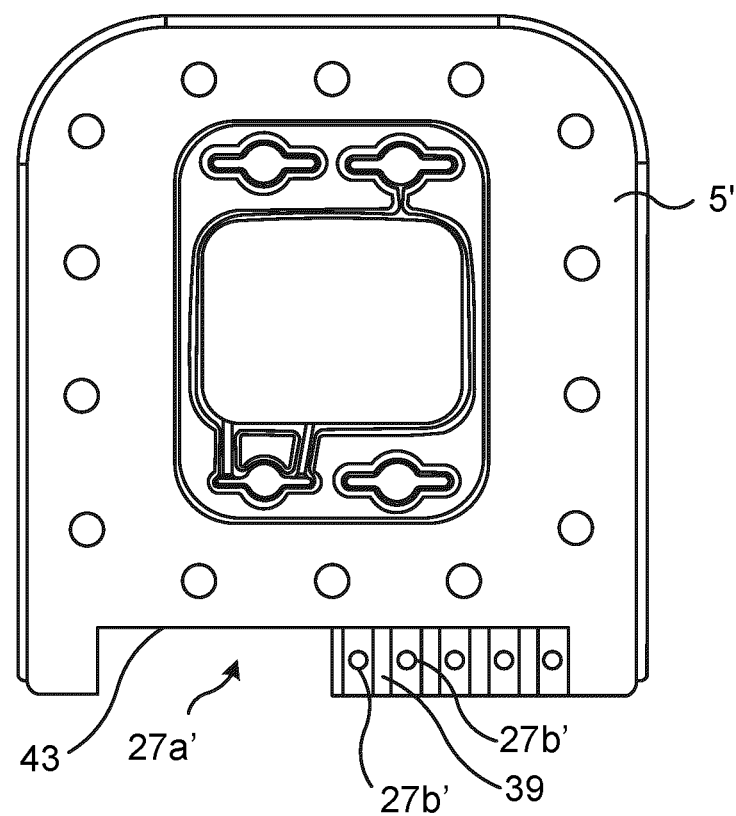
FIG. 5a schematically depicts a perspective view of another example of a second electrode plate.
Figure 5B:
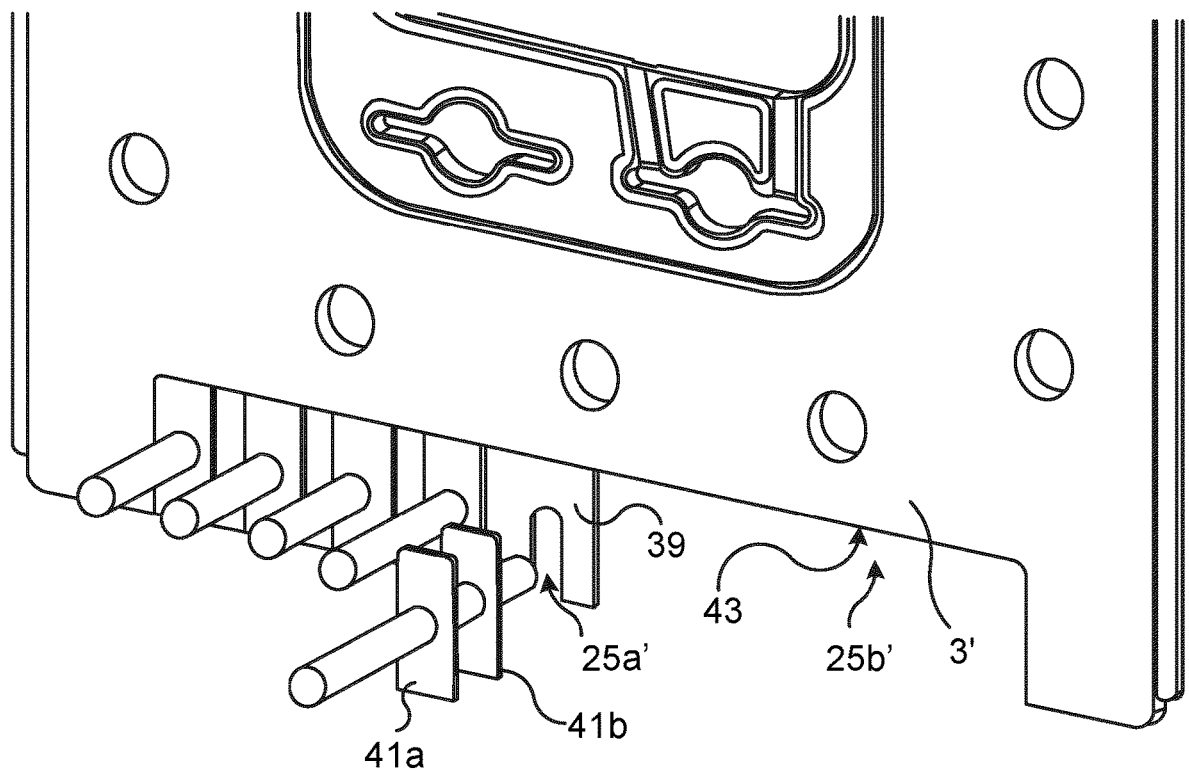
FIG. 5b is a schematic close-up view of the second electrode plate in FIG. 5a with a busbar and spacers removed from the second electrode plate.

FIG. 5a shows another example of a second electrode plate 5' and FIG. 5b shows a corresponding first electrode plate 3'. The second electrode plate 5' is similar to the one described with reference to FIG. 2a. The second electrode plate 5' however has an exposed area or region 39 where the underlying metal core has been exposed. The heat conductive polymer has hence been removed in the exposed region 39. The exposed region 39 is provided with a second electrode plate first busbar opening 27a' extending through the second electrode plate 5' and a second electrode plate second busbar opening 27b' which is smaller than the second electrode plate first busbar opening 27a'.

The first electrode plates are in this example similar to the exemplified second electrode plate 5', as shown in FIG. 5b, except that the first electrode plate first busbar opening 25a' has the structure of the second electrode plate second opening 27b' and located in the corresponding location where the second electrode plate first busbar opening 27a' is located, and that the first electrode plate second busbar opening 25b' has the structure of the second electrode plate first opening 27a' and is located in the corresponding location where the second electrode plate second busbar opening 27b' is located, in addition to the differences regarding the water channels and the two gas channels, which are alternatingly connected to the inner volume.

In the present example, there are a plurality of second electrode plate second busbar openings 27b' in the exposed region 39 in order to be able to feed more current to the second electrode plate 5'. The electrode system may comprise more than one busbar per polarity, i.e. two or more cathode busbars and two or more anode busbars. This may apply to variations of any of the example disclosed herein.

The exemplified electrode system may furthermore comprise a plurality of electrically conducting spacers 41a and 41b. The spacers 41a and 41b may for example comprise or consist of copper or aluminium. The spacers 41a and 41b are essentially planar or planar. Each spacer 41a-41b has a through-opening configured to receive a first or second busbar.

Each of the one or more second electrode plate second busbar openings 27b', and one or more first electrode plate first busbar openings, may be associated with respective two spacers 41a and 41b. In particular, two spacers 41a and 41b may be arranged in electrical connection with the exposed region 39 and hence the wall in which the second busbar second openings 27b' are provided. One spacer 41a is arranged on one side of the corresponding opening 27'b and another spacer 41b is arranged on the opposite side of the opening 27'b. Both the front and the rear surfaces of the exposed region 39 are hence in mechanical and electrical contact with a respective spacer 41a, 41b. The thickness of the conducting material with which the busbars are in contact may thereby be increased. The spacers 41a and 41b hence act as an additional contact surfaces for the busbars. This increases the length by which the busbars are in electrical contact with the electrode plates, which is advantageous in case the electrode plates are very thin and large currents are to be passed to the electrode plates. The current passed from the busbars to the electrode plates may thereby be increased. Each electrode plate is provided with such spacers 41a-41b arranged in contact with the exposed regions.

During assembly, all of the spacers for a busbar may be provided around the busbar one after the other with the appropriate distance between them so that they can be arranged in mechanical contact with the rear and front surfaces of the regions 39 of every e.g. second electrode plate of the electrode stack. There are hence typically twice as many spacers mounted around a busbar than there are electrode plates of a certain type, i.e. first electrode plates or second electrode plates. The same applies also for the first electrode plates and their spacers.

Each busbar may be provided with end threads on both ends. By providing a respective nut or similar fastening means on both ends and screwing them in opposite directions, they will move towards each other and eventually bear against the two outermost spacers on opposite sides of the electrode stack. The spacers will thereby be fixed tightly in the electrode stack.

The top surface 43 of the second electrode plate first busbar opening 27a' of each second electrode plate 5' may be provided with an insulating material, such as a heat conducting polymer. Electrical insulation may thereby be provided against spacers extending from the busbar in the second electrode plate first busbar opening 27a'. Similarly, the top surface 43 of the first electrode plate second busbar openings may be provided with an insulating material such as a heat conducting polymer, to provide electrical insulation from the spacers.

Figure 6A:
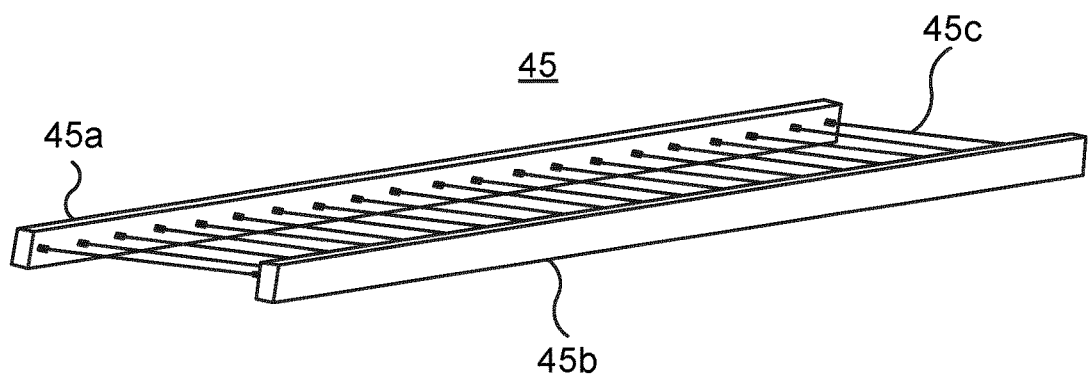
FIG. 6a schematically shows a perspective view of an example of a busbar.
Figure 6B:
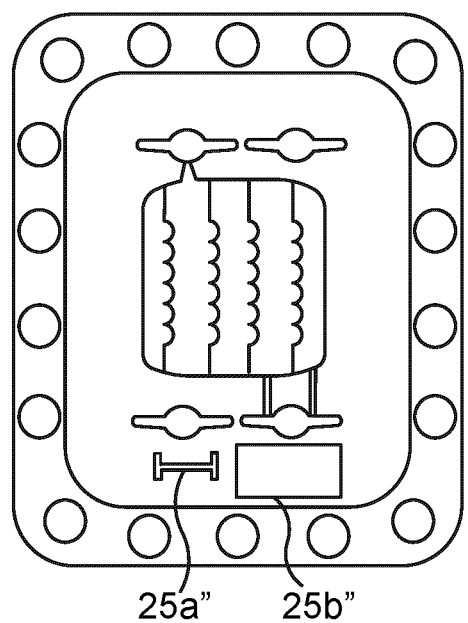

FIG. 6a shows a perspective view of another example of a first/second busbar 45. The busbar 45 has a generally H-shaped configuration in cross-section and a ladder configuration in perspective or longitudinally. The busbar 45 has a first bar 45a and a second bar 45b extending parallel, and a plurality of rungs 45c extending between the first bar 45a and the second bar 45b. The first bar 45a and the second bar 45b may typically both be cathodes or both be anodes. The rungs 45c are attached in a flexible or movable manner to the first bar 45a and the second bar 45b. Alternatively or additionally, the rungs 45c may themselves be flexible. The first bar 45a and the second bar 45b are hence movable relative to each other. The first electrode plate and the second electrode plate may in this case have corresponding first electrode plate first busbar openings and second electrode plate second busbar openings. These openings may hence also have a generally H-shaped structure, as shown for a first electrode plate 3" in FIG. 6b. The first electrode plate 3" has a first electrode plate first busbar opening 25a" which is generally H-shaped and configured to receive and be arranged in mechanical contact with the busbar 45 when the busbar 45 extends therethrough. The first electrode plate 3" has a first electrode plate second busbar opening 25b" which is larger than the corresponding cross-sectional dimensions of the busbar 45. A second busbar of the type shown in FIG. 6a may then extend through this opening without any mechanical contact with the first electrode plate 3". The shape of the openings is interchanged on the second electrode plates in a similar manner as has been described above with respect to other examples.

The shape of the openings may for example be cut by means of laser. Due to the flexible design of the busbar 45, any tolerance or alignment problems may be mitigated when inserting the busbar 45 into the openings of the electrode stack during assembly.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:
1. An electrode system comprising:
a plurality of first electrode plates and a plurality of second electrode plates arranged alternatingly to form an electrode stack,
each first electrode plate having a first electrode plate first busbar opening and a first electrode plate second busbar opening extending through the first electrode plate, the first electrode plate second busbar opening being larger than the first electrode plate first busbar opening,
each second electrode plate having a second electrode plate first busbar opening extending through the second electrode plate, the second electrode plate first busbar opening being dimensioned larger than each of the first electrode plate first busbar openings and aligned with the first electrode plate first busbar openings, and a second electrode plate second busbar opening extending through the second electrode plate, the second electrode plate second busbar opening being dimensioned smaller than each of the first electrode plate second busbar openings and aligned with the first electrode plate second busbar openings,
a first busbar extending through the first electrode plate first busbar openings and the second electrode plate first busbar openings, the first busbar being configured to be in mechanical contact with an inner first busbar surface of the first electrode plate first busbar openings only, and
a second busbar extending through the first electrode plate second busbar openings and the second electrode plate second busbar openings, the second busbar being configured to be in mechanical contact with an inner second busbar surface of the second electrode plate second busbar openings only,
wherein the first electrode plates have an electrically conductive first frame which delimits a respective first inner volume and the second electrode plates have an electrically conductive second frame which delimits a respective second inner volume, the frames being coated with a heat conductive polymer, wherein the first electrode plates and second electrode plates have an exposed region where a metal core has been exposed,
the exposed region of the first electrode plates being provided with the first electrode plate first busbar opening and the first electrode plate second busbar opening,
the exposed region of the second electrode plates being provided with the second electrode plate first busbar opening and the second electrode plate second busbar opening, and
a plurality of electrically conducting spacers, each having a through-opening receiving a first or a second busbar, wherein for each of the first electrode plates and the second electrode plates respective two spacers are arranged in electrical connection with the exposed region, one spacer being arranged on one side of the corresponding first electrode plate first busbar opening or second electrode plate second busbar opening and another spacer being arranged on the opposite side thereof, wherein both the front and the rear surfaces of the exposed regions are in mechanical and electrical contact with a respective spacer.

2. The electrode system of claim 1, wherein the first busbar is an anode busbar and the second busbar is a cathode busbar.

3. The electrode system of claim 1, wherein every first electrode plate is an anode and every second electrode plate is a cathode.

4. The electrode system of claim 1, wherein the first frames have a first oxygen gas channel, a first hydrogen gas channel, wherein of the first oxygen gas channel and the first hydrogen gas channel only the first oxygen gas channel is connected to the first inner volume, and a water channel connected to the first inner volume.

5. The electrode system of claim 4, wherein the second frames have a second oxygen gas channel aligned with the first oxygen gas channels, a second hydrogen gas channel aligned with the first hydrogen gas channels, wherein of the second oxygen gas channel and the second hydrogen gas channel only the second hydrogen gas channel is connected to the second inner volume, and a second water channel aligned with the water channel.

6. The electrode system of claim 1, wherein the first busbar is configured to engage with the inner first busbar surfaces and the second busbar is configured to engage with the inner second busbar surfaces.

7. The electrode system of claim 1, wherein the inner first busbar surfaces are threaded and the first busbar is provided with external threads configured to form a threaded connection with the threads of the inner first busbar surfaces, and the inner second busbar surfaces are threaded and the second busbar is provided with external threads configured to form a threaded connection with the threads of the inner second busbar surfaces.

8. The electrode system of claim 7, wherein the first busbar and the second busbar have a circular cross section.

9. The electrode system of claim 1, wherein the electrode system is an electrolyser system.

10. An electrode system comprising:
a plurality of first electrode plates and a plurality of second electrode plates arranged alternatingly to form an electrode stack,
each first electrode plate having a first electrode plate first busbar opening and a first electrode plate second busbar opening extending through the first electrode plate, the first electrode plate second busbar opening being larger than the first electrode plate first busbar opening,
each second electrode plate having a second electrode plate first busbar opening extending through the second electrode plate, the second electrode plate first busbar opening being dimensioned larger than each of the first electrode plate first busbar openings and aligned with the first electrode plate first busbar openings, and a second electrode plate second busbar opening extending through the second electrode plate, the second electrode plate second busbar opening being dimensioned smaller than each of the first electrode plate second busbar openings and aligned with the first electrode plate second busbar openings,
a first busbar extending through the first electrode plate first busbar openings and the second electrode plate first busbar openings, the first busbar being configured to be in mechanical contact with an inner first busbar surface of the first electrode plate first busbar openings only, and
a second busbar extending through the first electrode plate second busbar openings and the second electrode plate second busbar openings, the second busbar being configured to be in mechanical contact with an inner second busbar surface of the second electrode plate second busbar openings only, wherein the first busbar is provided with a plurality of radially outwards extending first fins, the first fins being provided with a respective first fin locking structure, and the inner first busbar surface is provided with a plurality of radially inwards extending first protrusions each provided with an inner first locking structure, each inner first locking structure being configured to mate with a respective first fin locking structure.

11. The electrode system of claim 10, wherein the first fin locking structures are tangential protrusions configured to snap-fit with a respective inner first locking structure.

12. The electrode system of claim 10, wherein the second busbar is provided with a plurality of radially outwards extending second fins, the second fins being provided with a respective second fin locking structure, and the inner second busbar surface is provided with a plurality of radially inwards extending second protrusions each provided with an inner second locking structure, each inner second locking structure being configured to mate with a respective second fin locking structure.

13. The electrode system of claim 12, wherein the second fin locking structures are tangential protrusions configured to snap-fit with a respective inner second locking structure.

* * * * *